US012792635B2

(12) United States Patent
Ganesan et al.

(10) Patent No.: US 12,792,635 B2
(45) Date of Patent: Nov. 10, 2026

(54) TRAINING FOUNDATION MODELS ON TABULAR DATA

(71) Applicant: INTERNATIONAL BUSINESS MACHINES CORPORATION, Armonk, NY (US)

(72) Inventors: Balaji Ganesan, Bengaluru (IN); Avirup Saha, Kolkata (IN); Muhammed Abdul Majeed Ameen, Kozhikode (IN); Soma Shekar Naganna, Bangalore (IN); Sameep Mehta, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 18/374,955

(22) Filed: Sep. 29, 2023

(65) Prior Publication Data

US 2025/0110970 A1 Apr. 3, 2025

(51) Int. Cl.
*G06F 16/28* (2019.01)
*G06F 16/22* (2019.01)

(52) U.S. Cl.
CPC ........ *G06F 16/285* (2019.01); *G06F 16/2282* (2019.01)

(58) Field of Classification Search
CPC .. G06F 16/2282; G06F 16/285; G06F 18/211; G06N 20/00; G06N 7/01; G06N 3/08; G06N 3/09
See application file for complete search history.

(56) References Cited

U.S. PATENT DOCUMENTS

| | | | | |
|---|---|---|---|---|
| 7,720,846 | B1 * | 5/2010 | Bayliss | G06F 16/285 707/736 |
| 11,586,838 | B2 | 2/2023 | He et al. | |
| 2020/0192928 | A1 * | 6/2020 | Arar | G06F 16/3334 |
| 2020/0272845 | A1 | 8/2020 | He et al. | |
| 2022/0318224 | A1 * | 10/2022 | Thompson | G06V 10/70 |
| 2023/0259787 | A1 * | 8/2023 | David | G06N 3/0455 706/15 |
| 2024/0152557 | A1 | 5/2024 | Ameen et al. | |
| 2025/0045634 | A1 * | 2/2025 | Merrick | G06F 16/2282 |

(Continued)

OTHER PUBLICATIONS

Chao Ye et al., "CT-BERT: Learning Better Tabular Representations Through Cross-Table Pre-training", arxiv.org Cornell University Library, Ithaca, NY 14853, XP09155991510 Jul. 2023, 14 Pages.

(Continued)

*Primary Examiner* — Amy Ng
*Assistant Examiner* — Cheryl M Shechtman
(74) *Attorney, Agent, or Firm* — Seed Intellectual Property Law Group LLP

(57) ABSTRACT

A processor set is configured to receive tabular data records and generate a plurality of clusters, associated with specific real-world entities, within the received tabular data records, wherein each cluster is associated with a specific real-world entity. The processor set may further identify informative features within a first cluster and mask a subset of the informative features. Based on the masked subset of informative features and using self-supervision techniques, the processor set may train a tabular foundation model.

15 Claims, 5 Drawing Sheets

(56) References Cited

U.S. PATENT DOCUMENTS

2025/0337657 A1* 10/2025 Zhu ........................ G01S 13/003
2026/0178558 A1* 6/2026 Naimat ............... G06F 16/2282

OTHER PUBLICATIONS

International Searching Authority, "Notification of Transmittal of the International Search Report and the Written Opinion of the International Searching Authority, or Declaration," Patent Cooperation Treaty, Dec. 20, 2024, 11 pages, International Application No.—PCT/ EP2024/076892.
Jaitly et al., "xEM: Explainable Entity Matching in Customer 360", https://arxiv.org/abs/2212.00342, Dec. 1, 2022; 5 Pages.
Vogel et al., "Towards Foundation Models for Relational Databases [Vision Paper]", https://arxiv.org/abs/2305.15321, May 24, 2023; 7 Pages.
Chitlangia et al., "Self Supervised Pre-training for Large Scale Tabular Data", https://www.amazon.science/publications/self-supervised-pre-training-for-large-scale-tabular-data, Accessed Jul. 18, 2023; 8 Pages.
Deng et al., "TURL: Table Understanding through Representation Learning", https://arxiv.org/abs/2006.14806, Dec. 3, 2020; 14 Pages.
Peeters et al., "Using ChatGPT for Entity Matching", https://arxiv.org/abs/2305.03423, May 5, 2023; 10 Pages.
Bavarian et al., "Efficient Training of Language Models to Fill in the Middle", https://arxiv.org/abs/2207.14255, Jul. 28, 2022; 30 Pages.
Borisov et al., "Language Models Are Realistic Tabular Data Generators", https://arxiv.org/abs/2210.06280, Apr. 22, 2023; 18 Pages.
Huang et al., "TabTransformer: Tabular Data Modeling Using Contextual Embeddings", https://arxiv.org/abs/2012.06678, Dec. 11, 2020; 17 Pages.
Iida et al., "TABBIE: Pretrained Representations of Tabular Data", https://arxiv.org/abs/2105.02584, May 6, 2021; 11 Pages.
Islam et al., "Fair Data Generation using Language Models with Hard Constraints", https://ctrlgenworkshop.github.io/camready/45/CameraReady/Fair_Data_Generation_using_Language_Models_with_Hard_Constraints_Final_Camera_Ready.pdf, Dec. 6, 2021; 10 Pages.
Narayan et al., "Can Foundation ModelsWrangle Your Data?", https://arxiv.org/abs/2205.09911, Dec. 24, 2022; 12 Pages.
Padhi et al., "Tabular Transformers for Modeling Multivariate Time Series", https://arxiv.org/abs/2011.01843, Feb. 11, 2021; 5 Pages.
Zhang et al., "PEGASUS: Pre-training with Extracted Gap-sentences for Abstractive Summarization", https://arxiv.org/abs/1912.08777, Jul. 10, 2020; 12 Pages.
Balasubramanian, "NPTEL Lecture on Self-supervised Learning", https://www.youtube.com/watch?v=hTroTWINb5w, Accessed Sep. 29, 2023; 1 Page.
Pathak et al., "Context Encoders: Feature Learning by Inpainting", https://arxiv.org/pdf/1604.07379.pdf, Nov. 21, 2016; 9 Pages.

* cited by examiner

TRAINING FOUNDATION MODELS ON TABULAR DATA

BACKGROUND

Aspects of the present invention relate generally to computer systems and, more particularly, to training a foundation model for analytics on tabular data.

Over the last decade, there has been an explosion of applications for artificial intelligence (AI). In that time, AI has gone from generally a purely academic endeavor to a force powering actions across myriad industries and affecting the lives of millions each day.

In recent years, AI systems have been built to learn from thousands, or millions, of examples to help the world better understand everything around us, or to find new solutions to difficult problems. These large-scale models have led to systems that can understand written- and spoken-language, such as the natural-language processing and understanding programs that are used every day, from digital assistants to speech-to-text programs. Other systems, trained on things like the entire work of famous artists, or every chemistry textbook in existence, have paved the way for generative models that can create new works of art based on those styles, or new compound ideas based on the history of chemical research.

SUMMARY

In a first aspect of the invention, there is a computer-implemented method including: receiving, by a processor set, a plurality of tabular data records; generating, by the processor set, a plurality of clusters within the received plurality of tabular data records, wherein each cluster is associated with a specific real-world entity; identifying, by the processor set, informative features within a first cluster of the plurality of clusters of the received plurality of tabular data records; masking, by the processor set, a subset of the identified informative features within the first cluster of the plurality of clusters of the received plurality of tabular data records; and training, by the processor set, a tabular foundation model, using self-supervision techniques, based on the masked subset of the identified informative features within the first cluster of the plurality of clusters of the received plurality of tabular data records.

In another aspect of the invention, there is a computer program product including one or more computer readable storage media having program instructions collectively stored on the one or more computer readable storage media. The program instructions are executable to: receive a plurality of tabular data records; generate a plurality of clusters within the received plurality of tabular data records, wherein each cluster is associated with a specific real-world entity; identify informative features within a first cluster of the plurality of clusters of the received plurality of tabular data records; mask a subset of the identified informative features within the first cluster of the plurality of clusters of the received plurality of tabular data records; and train a tabular foundation model, using self-supervision techniques, based on the masked subset of the identified informative features within the first cluster of the plurality of clusters of the received plurality of tabular data records.

In another aspect of the invention, there is a system including a processor set, one or more computer readable storage media, and program instructions collectively stored on the one or more computer readable storage media. The program instructions are executable to: receive a plurality of tabular data records; generate a plurality of clusters within the received plurality of tabular data records, wherein each cluster is associated with a specific real-world entity; identify informative features within a first cluster of the plurality of clusters of the received plurality of tabular data records; mask a subset of the identified informative features within the first cluster of the plurality of clusters of the received plurality of tabular data records; and train a tabular foundation model, using self-supervision techniques, based on the masked subset of the identified informative features within the first cluster of the plurality of clusters of the received plurality of tabular data records.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
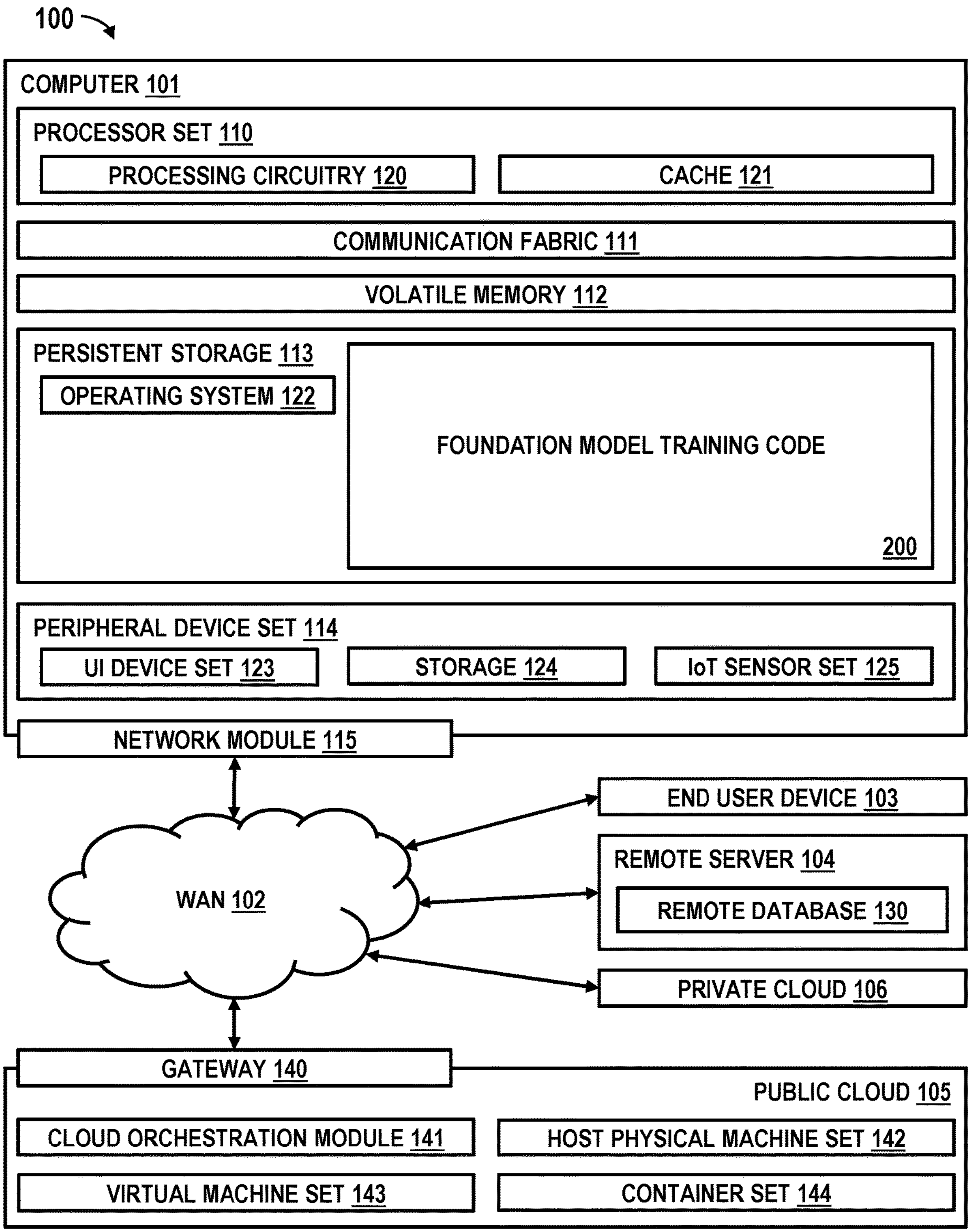
FIG. 1 depicts a computing environment according to an embodiment of the present invention.

Aspects of the present invention relate generally to computer systems and more specifically to training a foundation model with tabular data. In embodiments, foundation models are large-scale, large-language models which use deep learning algorithms and can recognize, summarize, translate, predict, and generate content using very large data sets. In some instances, a foundation model represents a class of deep learning architectures such as transformer networks, which is a neural network that learns context and meaning by tracking relationships in sequential data, e.g., words in a sentence.

According to aspects of the invention, a processor set receives tabular records for entity matching, sorts the records into buckets, generates transitive links between input records, and generates clusters of records within the tabular records. In embodiments, the processor set prepares records for pre-training the foundation model and then trains a tabular foundation model (TaFM) using self-supervised learning with multiple loss functions.

According to an aspect of the invention, there is a computer-implemented method including: receiving, by a processor set, a plurality of tabular data records; generating, by the processor set, a plurality of clusters within the received plurality of tabular data records, where each cluster is associated with a specific real-world entity; identifying, by the processor set, informative features within a first cluster of the plurality of clusters of the received plurality of tabular data records; masking, by the processor set, a subset of the identified informative features within the first cluster of the plurality of clusters of the received plurality of tabular data records; and training, by the processor set, a tabular foundation model, using self-supervision techniques, based on the masked subset of the identified informative features within the first cluster of the plurality of clusters of the received plurality of tabular data records. Training tabular foundation models provides a more efficient method for training foundation models on tabular data and provides models that find meaningful data within tabular data sets more accurately.

In embodiments, the method further includes exporting, by the processor set, at least a portion of the trained tabular foundation model to a database or a user device. This feature provides a method for distributing the more efficiently trained and more accurate tabular foundation model.

In embodiments, the method further includes bucketing, by the processor set, the received plurality of tabular data records into at least one bucket by analyzing the plurality of tabular data records and assigning each of the tabular data records to a bucket of the at least one bucket based on at least one of the identified informative features. This feature provides scale to the vast amounts of tabular data and enables the method to work more efficiently.

In embodiments, the method further includes generating, by the processor set, a plurality of transitive links between data records having a transitive relationship. This feature enables the method to scale clustering to vast amounts of tabular data and enables the method to work more efficiently.

In embodiments, the method for training the tabular foundation model further includes optimizing, by the processor set, the training using self-supervision techniques comprising a representative row generation function, a masked cell modeling function, and an entity matching function. In such embodiments, the representative row generation function measures a categorical cross entropy loss, the masked cell modeling function measures a cross entropy loss, and the entity matching function measures a contrastive learning score. These self-supervision techniques enable the tabular foundation model to learn complex patterns from the received tabular data. The self-supervision techniques further enable the system to work more efficiently when deployed due to its ability to train. In other words, one purpose of using self-supervision techniques such as those currently listed, is to learn complex patterns from the received tabular data. Self-supervised learning allows the system to work more efficiently when deployed due to its ability to train itself. Thus, the self-supervision techniques require less training time. Accordingly, when fed with data, the system generates data labels, which are further used in subsequent iterations as ground truths, thereby making the training process more efficient.

In embodiments, the tabular foundation model is trained to predict a representative row that captures information from at least one source row. Predicting a representative row in tabular data is an improvement on foundation models because previous models were unable to predict such data outside a natural-language type of format.

In further embodiments, identifying the informative features within the first cluster includes using an explainable entity matching technique to identify a column in the first cluster containing the informative features. Explainable entity matching provides context to data relationships within the tabular data and enables the method to find meaningful data within tabular data sets.

According to an aspect of the invention, there is provided a computer program product comprising one or more computer readable storage media having program instructions collectively stored on the one or more computer readable storage media, the program instructions executable to: receive a plurality of tabular data records; generate a plurality of clusters within the received plurality of tabular data records, where each cluster is associated with a specific real-world entity; identify informative features within a first cluster of the plurality of clusters of the received plurality of tabular data records; mask a subset of the identified informative features within the first cluster of the plurality of clusters of the received plurality of tabular data records; and train a tabular foundation model, using self-supervision techniques, based on the masked subset of the identified informative features within the first cluster of the plurality of clusters of the received plurality of tabular data records. Training tabular foundation models in this way provides a more efficient method for training foundation models and provides models that accurately find meaningful data within tabular data sets.

In embodiments, the instructions of the computer program products are further executable to export at least a portion of the trained tabular foundation model to a database or a user device. This feature provides a method for distributing the more efficiently trained and more accurate tabular foundation model.

In embodiments, the instructions of the computer program products are further executable to bucket the received plurality of tabular data records into at least one bucket by analyzing the plurality of tabular data records and assigning each of the tabular data records to a bucket of the at least one bucket based on the subset of the identified informative features. This feature provides scale to the vast amounts of tabular data and enables the method to work more efficiently.

In embodiments, the instructions of the computer program products are further executable to generate a plurality of transitive links between data records having a transitive relationship. This feature also provides scale to the vast amounts of tabular data and enables the method to work more efficiently.

In embodiments, the instructions for training the tabular foundation model further includes optimizing, by the processor set, the training using self-supervision techniques comprising a representative row generation function, a masked cell modeling function, and an entity matching function. In such embodiments, the representative row generation function measures a categorical cross entropy loss, the masked cell modeling function measures a cross entropy loss, and the entity matching function measures a contrastive learning score. These self-supervision techniques enable the tabular foundation model to learn complex patterns from the received tabular data. The self-supervision techniques further enable the system to work more efficiently when deployed due to its ability to train. In other words, one purpose of using self-supervision techniques such as those currently listed, is to learn complex patterns from the received tabular data. Self-supervised learning allows the system to work more efficiently when deployed due to its ability to train itself. Thus, the self-supervision techniques require less training time. Accordingly, when fed with data, the system generates data labels, which are further used in subsequent iterations as ground truths, thereby making the training process more efficient.

In embodiments, the tabular foundation model described herein is trained to predict a representative row that captures information from at least one source row. Predicting a representative row in tabular data is an improvement on foundation models because previous models were unable to predict such data outside a natural-language type of format.

In further embodiments, identifying the informative features within the first cluster includes using an explainable entity matching technique to identify a column in the first cluster containing the informative features. Explainable entity matching provides context to data relationships within the tabular data and enables the method to find meaningful data within tabular data sets.

According to an aspect of the invention, there is provided a system comprising: a processor set, one or more computer readable storage media, and program instructions collectively stored on the one or more computer readable storage media, the program instructions executable to: receive a plurality of tabular data records; generate a plurality of clusters within the received plurality of tabular data records, where each cluster is associated with a specific real-world entity; identify informative features within a first cluster of the plurality of clusters of the received plurality of tabular data records; mask a subset of the identified informative features within the first cluster of the plurality of clusters of the received plurality of tabular data records; and train a tabular foundation model, using self-supervision techniques, based on the masked subset of the identified informative features within the first cluster of the plurality of clusters of the received plurality of tabular data records. Training tabular foundation models in this way, provides a more efficient method for training foundation models and it provides models that accurately find meaningful data within tabular data sets.

In embodiments, the instructions of the computer program products are further executable to bucket the received plurality of tabular data records into at least one bucket by analyzing the plurality of tabular data records and assigning each of the tabular data records to a bucket of the at least one bucket based on the subset of the identified informative features and generate a plurality of transitive links between data records having a transitive relationship. In embodiments, the bucketing feature can be present. In embodiments, generating transitive links can be present. Together and alone, these features provide scale to the vast amounts of tabular data and enables the method to work more efficiently.

In embodiments, the instructions for training the tabular foundation model further includes optimizing, by the processor set, the training using self-supervision techniques comprising a representative row generation function, a masked cell modeling function, and an entity matching function. In such embodiments, the representative row generation function measures a categorical cross entropy loss, the masked cell modeling function measures a cross entropy loss, and the entity matching function measures a contrastive learning score. These self-supervision techniques enable the tabular foundation model to learn complex patterns from the received tabular data. The self-supervision techniques further enable the system to work more efficiently when deployed due to its ability to train itself. In other words, one purpose of using self-supervision techniques such as those currently listed, is to learn complex patterns from the received tabular data. Self-supervised learning allows the system to work more efficiently when deployed due to its ability to train itself. Thus, the self-supervision techniques require less training time. Accordingly, when fed with data, the system generates data labels, which are further used in subsequent iterations as ground truths, thereby making the training process more efficient.

In further embodiments, identifying the informative features within the first cluster includes using an explainable entity matching technique to identify a column in the first cluster containing the informative features. Explainable entity matching provides context to data relationships within the tabular data and enables the method to find meaningful data within tabular data sets.

Embodiments and aspects of the invention provide a system to train foundation models on tabular data using entity matching. In embodiments, the system may include an input module (e.g., a publisher) for consuming very large amounts of tabular data. According to an aspect of the invention, the system may further include a bucketing and transitive linking module for scalable entity matching (e.g., Match 360® system from IBM™). The system may also include a training module for training foundation models on the entity matching output (e.g., clusters).

Embodiments and aspects of the invention also provide a method that includes pre-training foundation models on tabular data using self-supervision. In an embodiment, the method further includes learning to predict/generate a representative row that captures maximum information from one or more source rows. According to at least one aspect of the invention, the method further includes optimizing the foundation models using at least three loss functions during the model training, including a representative row generation loss function. In an embodiment, the three loss functions include: categorical cross entropy, masked cell modeling (or cross entropy), and entity matching (or contrastive learning score).

Embodiments and aspects of the invention also provide a method to use explainable entity matching to identify columns for the masked cell prediction objective. Accordingly, during foundation model training, informative cells (also referred to as important cells herein) are identified for a particular dataset. In a masked cell modeling embodiment, the cells identified as informative cells for entity matching are masked. In the embodiments, informative cells are identified by identifying a random subset of records for each entity (e.g., a cluster of records). The method uses a Graph Neural Network (GNN) model, or another model that has been trained on tabular data for predicting if a pair of records match or if the pair of records does not match using a pair-wise entity matching task. A GNN Explainer model is used to identify which node features were more informative/important for the prediction.

In embodiments, foundation models are large-scale, large-language models which use deep learning algorithms and can recognize, summarize, translate, predict, and generate content using very large data sets. In some instances, a foundation model represents a class of deep learning architectures such as transformer networks, which is a neural network that learns context and meaning by tracking relationships in sequential data, e.g., words in a sentence.

A data fabric is an architecture and set of data services that provide consistent capabilities across a choice of endpoints spanning hybrid multi-cloud environments. Further, the data fabric is an architecture that standardizes data management practices and practicalities across a cloud, on premises, and across edge devices. Data fabric affords many advantages, including data visibility and insights, data access and control, data protection, and security. A data fabric is an adaptive integrated data architecture that can reach anywhere, including on premises, public and private clouds, and edge and IoT devices, while remaining centrally governed. The data fabric is typically dominated by tabular data. However, the foundation models that are currently used are trained on unstructured data. While foundation models trained on unstructured data have been shown to perform some tasks on tabular data, those foundation models have drawbacks. For example, foundation models trained on unstructured data do not work on tasks such as entity matching, they are not able to exploit any tabular data on which downstream tasks are to be applied, and they learn language constructs that are likely redundant for tabular data. In an example, foundation models excel in digesting natural language content, such as a natural-language sentence. The foundation model can identify the context of the sentence, and specific entities described within a sentence. The foundation model can detect verbs, nouns, subjects, etc., and can parse the data in a manner that is meaningful to a human. However, tabular data does not have a sentence structure. Thus, foundation models are incapable of accurately finding meaningful data within tabular data sets.

In view of the above, current solutions for training foundation models in data fabric applications having tabular data are not sufficient. The embodiments and aspects disclosed herein provide a method for pre-training and training foundation models using tabular data, so that a generated tabular foundation model (TaFM) can be used for various data management tasks in a data fabric. For example, the data fabric may include entity matching, data imputation, error detection, column header prediction, cell value prediction, etc. These tasks could not be satisfactorily performed using legacy methods. In an embodiment, these tasks may be performed using a TaFM that is trained on clusters of tabular data, using self-supervised learning, and incorporates at least three loss functions—categorical cross entropy, masked cell modeling (or cross entropy), and entity matching (or contrastive learning score). Each of these features help to provide meaning to tabular data and enables the model to perform entity matching, data imputation, error detection, column header prediction, cell value prediction, etc.

Implementations of the invention are necessarily rooted in computer technology. For example, the steps of receiving a plurality of tabular data records, generating a plurality of clusters, identifying informative features within a first cluster, masking a subset of the identified informative features, and training a TaFM are computer-based and cannot practically be performed in the human mind (or with pen and paper) due to the complexity and massive amounts of data and calculations involved. Given this scale and complexity, it is simply not possible for the human mind, or for a person using pen and paper, to perform the number of calculations involved in preparing vast amounts tabular data records to be used to train a foundation model and then use the vast amounts of tabular data records to train the foundation model as a TaFM, as disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as foundation model training code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
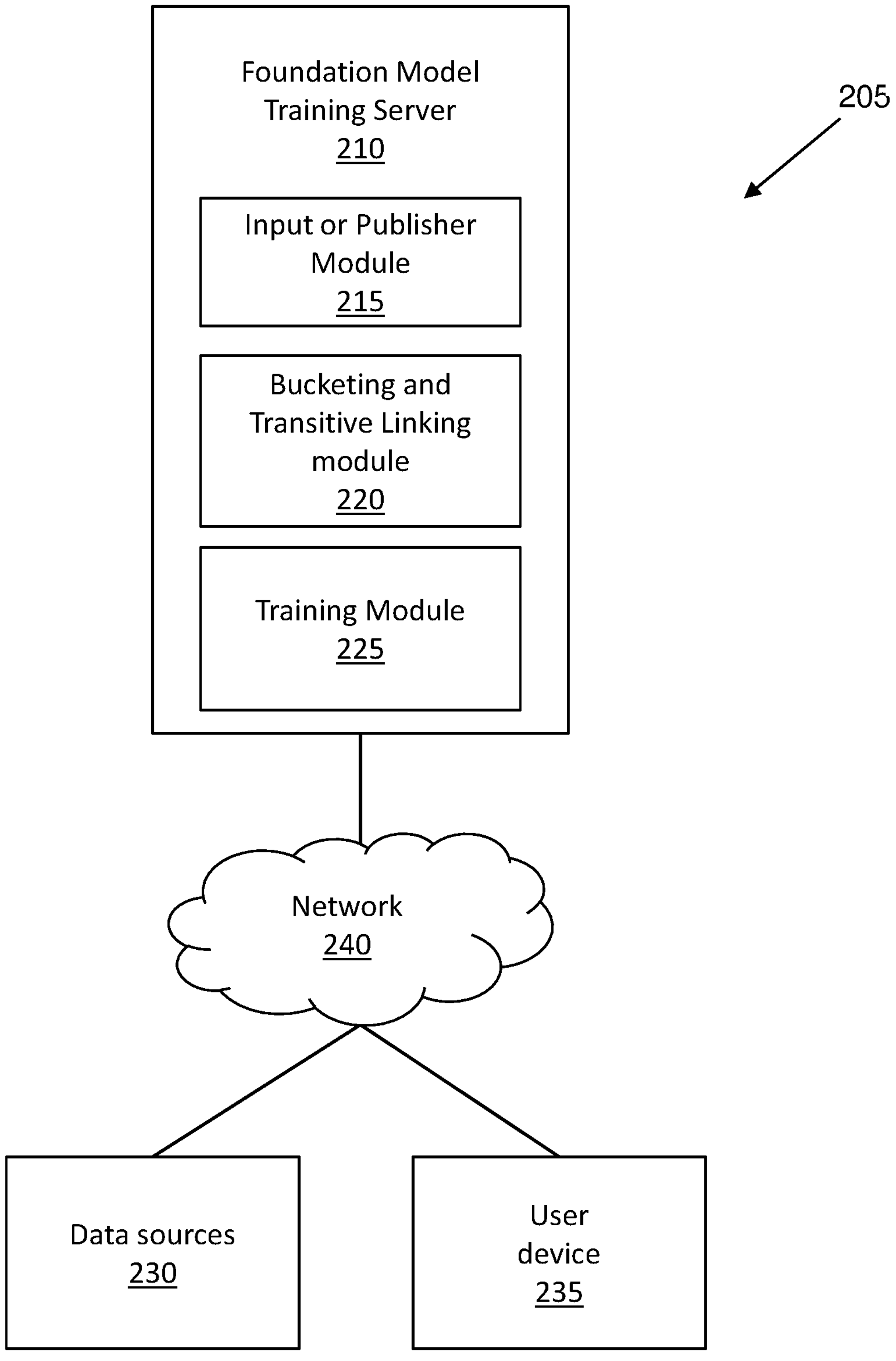
FIG. 2 shows a block diagram of an exemplary environment in accordance with aspects of the present invention.

FIG. 2 shows a block diagram of exemplary environment 205 in accordance with aspects of the invention. In embodiments, environment 205 includes a foundation model training server 210, data sources 230, user device 235, and network 240.

Foundation model training server 210 may comprise one or more instances of computer 101 of FIG. 1. In another example, foundation model training server 210 may comprise one or more virtual machines or containers running on one or more instances of computer 101 of FIG. 1. In embodiments, foundation model training server 210 communicates with data sources 230 and user device 235, via network 240, which may comprise WAN 102 of FIG. 1. In embodiments, data sources 230 comprise one or more data sources each comprising an instance of remote database 130 of FIG. 1. In embodiments, user device 235 may comprise an instance of end user device 103 of FIG. 1. There may be plural different instances of user device 235 used by different users and evaluators, respectively.

In embodiments, foundation model training server 210 of FIG. 2 comprises an input or publisher module 215, bucketing and transitive linking module 220, and training module 225, each of which may comprise modules of foundation model training code of block 200 of FIG. 1. Such modules may include routines, programs, objects, components, logic, data structures, and so on that perform a particular task (or tasks) or implement a particular data type (or types) that the foundation model training code of block 200 uses to carry out the functions and/or methodologies of embodiments of the invention as described herein. These modules of block 200 are executable by processing circuitry 120 of FIG. 1 to perform the inventive methods as described herein. Foundation model training server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, input or publisher module 215 is configured to receive, access, and/or input tabular records for entity matching. In embodiments input or publisher module 215 is configured to communicate with data sources 230 and/or user device 235 via network 240 to receive or access the tabular records.

In another example, bucketing and transitive linking module 220 is additionally (or alternatively) configured to analyze the received, accessed, or input tabular data and assign subsets of the tabular data to one or more buckets/bins. In other words, the bucketing technique divides the tabular data into smaller buckets/bins of data for scaling purposes. Bucketing and transitive linking module 220 is further configured to analyze the tabular data to determine transitive links between the received, accessed, or input tabular records.

In accordance with aspects of the invention, training module 225 is configured to generate and/or identify clusters of data records within the received, accessed, or input tabular data. Training module 225 is further configured to generate and/or identify a representative record within each cluster. In embodiments, when generating and/or identifying a representative record within each cluster, training module 225 may also generate one or more inputs from the tabular data to enable foundation model training. The one or more inputs may comprise a source row, a target row, positive and negative samples, and masked cells. In embodiments, training module 225 is also configured to identify and mask informative/important features within the representative record for the cluster of data records. Training module 225 is configured to then train the foundation model to predict the masked informative/important features of the representative record for the cluster of data records using self-supervision techniques that operate based on a plurality of loss functions. The loss functions used in the self-supervision techniques include, for example, a representative row generation (RRG) function, a masked-cell modeling (MCM) function, and an entity matching function.

Figure 3:
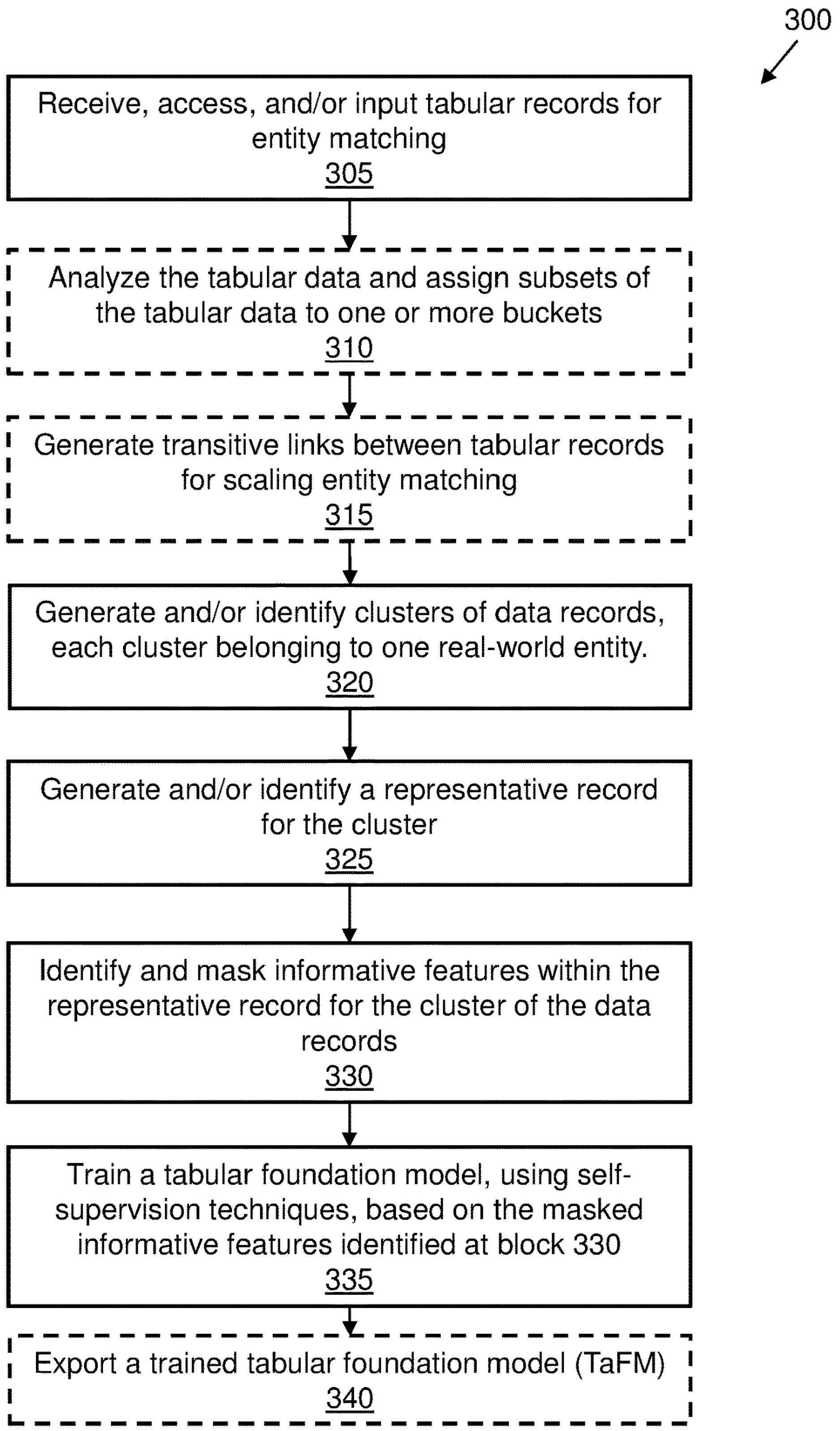
FIG. 3 shows a flowchart of an exemplary method in accordance with aspects of the present invention.

FIG. 3 shows a flowchart of an exemplary method 300 in accordance with aspects of the present invention. The method may be carried out in the environment of FIG. 2 and is described with reference to elements depicted in FIG. 2.

At block 305, the system receives, accesses, and/or inputs, by the input or publisher module 215 of foundation model training server 210 of FIG. 2, tabular records for entity matching. In embodiments, input or publisher module 215 receives the tabular records from data sources 230 and/or user device 235 via network 240. In other embodiments, input or publisher module 215 accesses the tabular records at data sources 230 and/or user device 235 via network 240. In yet additional embodiments, the tabular data may be stored at foundation model training server 210. In such embodiments, input or publisher module 215 may simply provide the tabular data as an input for the remaining aspects of this invention.

At block 310, the system analyzes, by the bucketing and transitive linking module 220 of foundation model training server 210 of FIG. 2, the tabular data from block 305 and assigns subsets of the tabular data to one or more buckets (also referred to as bins herein). This step may be an optional step, as designated by the dotted line in FIG. 3. In practice, this bucketing technique divides the tabular data into smaller buckets/bins of data (e.g., a subset of the total tabular data received) for scaling purposes. In other words, it is easier and less expensive to work with smaller data sets to prepare tabular module training data. The tabular data may be divided into buckets/bins based on any criteria that makes sense within the context of the data being analyzed and/or used, including an informative/important feature identified within the tabular data. For example, if the tabular data describes retail stores, the tabular data may be bucketed based on at least one informative/important feature, including for example, location, type of store, number of entities, number of records, entity name, etc. In embodiments, bucketing may further include using a hash function to assign each record to one of the buckets. Additionally, in embodiments the number of buckets may be chosen based on a modulo operation.

At block 315, the system analyzes, bucketing and transitive linking module 220 of foundation model training server 210 of FIG. 2 the tabular data from either block 305 or block 315 to generate transitive links between tabular records (e.g., the received tabular data and/or the bucketed data) for scaling entity matching. This step may be an optional step. For example, in an exemplary scenario with three records, records A, B, and C, if A is linked to B (A→B) and B is linked to C (B→C), bucketing and transitive linking module 220 will create a transitive link between A and B, B and C, and A and C (A→C) based on the transitive property and without any further analysis to determine if A is actually linked to C). In practice, this transitive linking groups the received tabular data and/or bucketed data into smaller groups of related data (e.g., a subset of the total received tabular data and/or a subset of the bucketed data) for scaling purposes. The data records may be linked based on any criteria that makes sense within the context of the data being analyzed and/or used. The transitive links may be formed based on the same or different criteria used to bucket the data above.

At block 320, the system generates and/or identifies, by the training module 225 of foundation model training server 210 of FIG. 2, clusters of data records within the received data. In embodiments, the clusters of data records belong to the real-world entities. In embodiments, the data to be clustered is received straight from foundation model training server 210 at block 305. While the data received directly from block 305 has not been bucketed and has not been transitive linked, the remaining features of method 300 may still be performed. In other embodiments, the data to be clustered is received straight from either the bucketing feature of block 310 or the transitive-link generating feature of block 315. In additional embodiments, the received tabular data at block 305 is processed at the bucketing feature of block 310 and the transitive-link generating feature of block 315.

As used herein, clusters are another grouping used to further scale down the received data records. In terms of hierarchy, clusters are smaller than the buckets/bins described with respect to block 310. In other words, a bucket or bin may comprise one or more clusters. A cluster is generally a group of records associated with the same real-world entity. For example, using the retail store example above, all the tabular data records that are associated with a first supermarket are generally placed within the same first cluster, while all the tab all the tabular data records that are associated with a second supermarket are generally placed within the same second cluster. In embodiments, although both the first and second clusters may be contained within the same bucket/bin, the first and second clusters are in different clusters. Furthermore, it is generally unlikely that data records from the same cluster span multiple buckets/bins. In embodiments, some of the data records received may not be categorized (or bucketed) according to the foregoing rules because the data records may contain outlying (i.e., incorrect) data. Therefore, some of the data records may be misplaced. As the system is trained in block 325, the outlying data will likely be corrected.

At block 325, the system generates and/or identifies, by the training module 225 of foundation model training server 210 of FIG. 2, a representative record for the cluster. A representative record, as used herein, is a record where each (or most) cell is most likely to be the most frequently used. For example, using the retail store example above, if a first cluster is associated with a first supermarket and a majority of the data records have a cell describing a first zip code and a minority number of data records describing one of several other zip codes, the data record identified as the representative record will likely include the first zip code, because it is likely the most frequently used. This same process will be repeated for additional cells describing different cell types, based on the context of the data being analyzed and/or used. In embodiments, the process is only repeated for data types that are determined to describe, or be associated with, informative features (i.e., important features). In embodiments, some of the columns of data may be disregarded as being non-informative/unimportant, again based on the context of the data being analyzed and/or used. In additional embodiments, the data record selected as the representative record may be randomly selected, then later verified as method 300 proceeds. While selecting a random record may slow down the entire process and may be more expensive, it is unlikely that it would negatively affect the end result.

When generating and/or identifying a representative record for the cluster, training module 225 may generate one or more inputs from the tabular data to enable foundation model training. That is the system may manipulate the data and/or identify portions of the data that may be used as inputs to better train the foundation model. The one or more inputs may comprise a source row, a target row, positive and negative samples, and masked cells and may be used at block 335 below.

Source rows, as used herein, refers to a set of rows that belong to the same real-world entity. However, each pair of rows of the source rows does not have a "same as" relation. Rows resolved as belonging to the real-world entity can be related by transitive linking. Source rows may be identified as early as block 310 when bucking the records and/or at block 315 when generating the transitive links. However, the source rows are generally not used until block 325 when generating and/or identifying a representative record for the cluster.

Target rows, as used herein, refers to a row that is representative of the source rows. In embodiments, the target row is selected from one of the original rows of the received data. In other embodiments, the target row is generated as representative of the data stored within the cluster, based on all of the records in that specific cluster.

Positive and negative samples, as used herein, refers to rows that have a "same as" and a "not same as" relationship with the target row. Records within a cluster can be used as positive samples for other records from within the same cluster. Further, records from other clusters can be used as negative samples for records not in the same cluster as the negative sample. In other words, positive samples are records taken from within the same cluster while negative samples are records taken from a different cluster.

It may be advantageous to provide hard negative samples, e.g., records that are not part of the cluster but are very similar to the records within the cluster. Sampling hard examples not only accelerates the convergence of a model during training, but also improves the model accuracy.

At block 330, the system identifies and masks, by the training module 225 of foundation model training server 210 of FIG. 2, informative/important features within the representative record for the cluster of data records. The cells are masked during a pre-training phase and are not selected randomly. According to an aspect of the invention, at least 15% of the most informative cells a designated for potentially being masked. Of the at least 15% of the cells designated for potentially being masked, at least 15% of the designated cells are left unmasked. In other words, at least 85% of the cells designated for potentially being masked are masked while the remaining 15% are left unmasked.

According to an aspect of the invention, informative cells are identified by identifying a random subset of records for each cluster of records. Using a Graph Neural Network (GNN) model, or another model that has also been trained on tabular data, the method includes predicting if a pair of records match or the pair of records does not match using a pair-wise entity matching task. For each pair-wise entity matching prediction, explanations identify informative/important features responsible for that match. In other words, in an embodiment, a GNN explainer model is used to identify which node features were more informative for developing the ultimate prediction.

At block 335, the system trains, by the training module 225 of foundation model training server 210 of FIG. 2, the foundation model to predict the masked important features of the representative record for the cluster of data records using self-supervision techniques. In embodiments, the foundation model is trained using one or more inputs, as described above. The one or more inputs may comprise a source row, a target row, positive and negative samples, and masked cells.

In an embodiment, the self-supervision techniques include using at least three loss functions: a representative row generation (RRG) function, a masked-cell modeling (MCM) function, and an entity matching function. The purpose of using self-supervision techniques such as those currently listed, is to learn complex patterns from the received tabular data. Self-supervised learning allows the system to work more efficiently when deployed due to its ability to train itself. Thus, the self-supervision techniques require less training time. Accordingly, when fed with data, the system generates data labels automatically, which are further used in subsequent iterations as ground truths. The model may also use high confidence data labels among those generated to train the model in the next iterations via backpropagation and the data labels used as ground truths in every iteration may be changed.

The RRG function is performed by calculating the loss experienced using the following categorical cross entropy function: $L_{RRG}$=CategoricalCrossEntropy(p, y), where $L_{RRG}$ is the RRG loss, p is the probability of the cell value, and y is the ground truth cell value. In an embodiment, p is given by the model as a softmax output. In other words, in embodiments, p is the result of an activation function that scales numbers/logits into probabilities. The softmax output is a vector with probabilities of each possible outcome, where all of the probabilities in the vector add up to one (1). In embodiments, y is the ground truth cell value. Thus, y is found using a self-score. A self-score, as used in this context, is a value or notion of how complete a row is. That is, when a row is more complete, y has a higher value. When a row is less complete, y has a lesser value.

With the masked-cell modeling (MCM) function, a cell value should be a named entity. In embodiments, a cell value occurs in the context of the other values in the row, and in each column the values follow a distribution. The MCM function is performed by calculating the loss experienced using the following categorical cross entropy function: $L_{MCM}$=CrossEntropyLoss(p, y), where p is the probability of a given cell value in the column vocabulary and where y is the ground truth cell value. The value for the probability of a given cell value in the column vocabulary increases as the probability of a value increases. For example, if a cell containing a 5-digit number is located within a column where each, or at least a majority of, of the other cells within the column list the same 5-digit number, the p value would be high.

The entity matching function provides representations of rows by contrastive learning on the entity matching task. Although records of a cluster likely belong to the same real-world entity, as explained above, each pair of records need not be similar—as with the representative record generation. In embodiments, with the entity matching function, the system may use the pair-wise entity matching scores from a probabilistic matching engine (PME) to get positive and negative samples. In the contrastive learning below, f is an encoder for row embedding. And if $x^+$ and $x^-$ are matched and non-matched records based on the PME scores, then:

$$\text{score}(f(x), f(x^+)) \gg \text{score}(f(x), f(x^-))$$

Using the foregoing values, the entity matching loss is given by:

$$\mathcal{L} = -\mathbb{E}\left[\log\frac{\exp(\text{score}(f(x), f(x^+))/\tau)}{\exp(\text{score}(f(x), f(x^+))/\tau) + \sum_{j=1}^{N-1}\exp(\text{score}(f(x), f(x_j^-))/\tau)}\right]$$

The RRG function is used in most embodiments. However, the MCM function and the entity matching function may be switched out for other loss functions that accomplish the same result. In other words, the MCM function can be replaced by another function that can train a model to predict masked cells, given the context provided by similar cells in related records. And the entity matching function may be replaced by another function that can train a model to evaluate matched and non-matched records based on probabilistic matching scores.

At block 340, the system exports, by the foundation model training server 201, the trained TaFM to data sources 230 and/or user device 235 via network 240. This step may be an optional step. In an embodiment, only portions of the trained TaFM are exported to data sources 230 and/or user device 235 via network 240, while some portions are retained at foundation model training server 201 for additional training and/or to retain some functionality at the foundation model training server 210. According to an aspect of the invention, the trained TaFM is functional across a network of processors.

Figure 4:
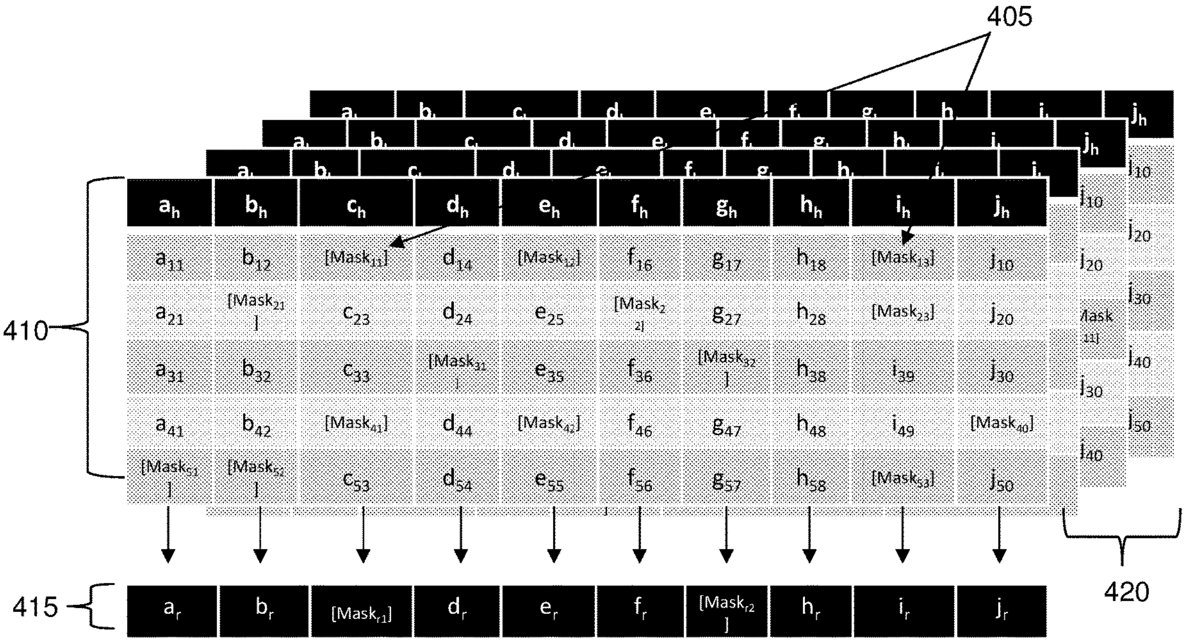
FIG. 4 illustrates an exemplary method for representative row generation (RRG) in accordance with aspects of the present invention.

FIG. 4 illustrates an exemplary method for representative row generation (RRG) in accordance with embodiments described herein. As shown, some of the informative cells 405 are masked so that the foundation model can learn to predict the contents of the cell. As explained above, by masking the most informative (i.e., most important) cells, the model learns to predict the most informative cells with higher accuracy. Source rows 410 are obtained from clusters on the tabular data. The source rows generally relate to each other, but not all of the rows will match pairwise. Target row 415 is the representative record chosen to represent the cluster. In the self-supervised setting, the model will learn to generate these rows with data that most accurately represents the data. Contrastive records 420 provide positive, negative, and hard negative samples to aid the self-supervised learning to better recognize correct and incorrect data.

Figure 5:
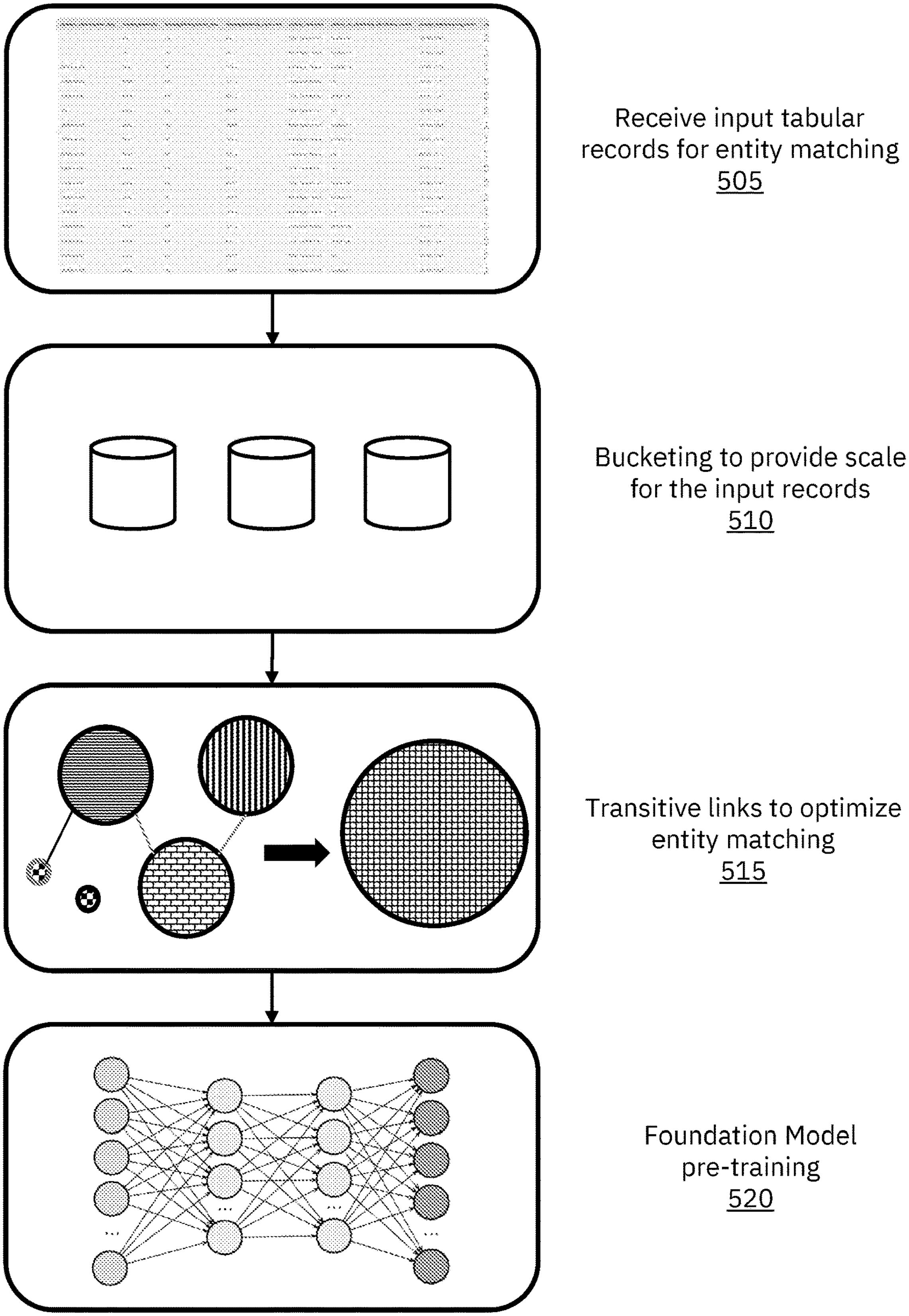
FIG. 5 illustrates an exemplary method in accordance with aspects of the present invention.

FIG. 5 illustrates an exemplary method in accordance with embodiments described herein. As shown, the system receives input tabular records for entity matching at block 505. At block 510, the system may perform bucketing to provide scale for the input records. Accordingly, the data is easier to sort and analyze. At block 515, the system may generate transitive links between input records to optimize entity matching and to provide scale for the input records. At block 520, the system prepares records for pre-training the foundation model in accordance with blocks 320, 325, 330, and 335 of FIG. 3.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system comprises one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, a plurality of tabular data records;

generating, by the processor set, a plurality of clusters within the received plurality of tabular data records, wherein each cluster is associated with a specific real-world entity;

identifying, by the processor set, informative features within a first cluster of the plurality of clusters of the received plurality of tabular data records by identifying a random subset of tabular data records for each cluster;

masking, by the processor set, a subset of the identified informative features within the first cluster of the plurality of clusters of the received plurality of tabular data records, the subset of the identified informative features including information associated with one or more source rows of the first cluster;

training, by the processor set, a tabular foundation model to perform a predictive data management task in a data fabric application, based on the received plurality of tabular data records, wherein the tabular foundation model corresponds to a deep learning model, and wherein the training comprises predicting, by the tabular foundation model, content of the masked subset of the identified informative features;

optimizing, by the processor set, the trained tabular foundation model using self-supervision techniques, wherein the self-supervision techniques operate based on at least three loss functions comprising a representative row generation function, a masked cell modeling function, and an entity matching function, wherein the representative row generation function measures a categorical cross entropy loss based on a ground truth cell value and a softmax output indicating a probability of a cell value, wherein the masked cell modeling function measures a cross entropy loss based on the ground truth cell value and the probability of the cell value, and wherein the entity matching function measures a contrastive learning score based on pair-wise entity matching scores from a probabilistic matching engine; and executing, by the processor set, the optimized tabular foundation model to perform the predictive data management task.

2. The computer-implemented method of claim 1, further comprising exporting, by the processor set, at least a portion of the trained tabular foundation model to a database or a user device.

3. The computer-implemented method of claim 1, further comprising bucketing, by the processor set, the received plurality of tabular data records into at least one bucket by analyzing the plurality of tabular data records and assigning each of the plurality of tabular data records to a bucket of the at least one bucket based on at least one of the identified informative features.

4. The computer-implemented method of claim 1, further comprising generating, by the processor set, a plurality of transitive links between data records having a transitive relationship.

5. The computer-implemented method of claim 1, wherein the tabular foundation model is trained to predict a representative row that captures information from at least one source row.

6. The computer-implemented method of claim 1, wherein the identifying the informative features within the first cluster further comprises using an explainable entity matching technique to identify a column in the first cluster containing the informative features.

7. A computer program product comprising one or more computer readable storage media having program instructions collectively stored on the one or more computer readable storage media, the program instructions executable to:

receive a plurality of tabular data records;

generate a plurality of clusters within the received plurality of tabular data records, wherein each cluster is associated with a specific real-world entity;

identify informative features within a first cluster of the plurality of clusters of the received plurality of tabular data records by identifying a random subset of tabular data records for each cluster;

mask a subset of the identified informative features within the first cluster of the plurality of clusters of the received plurality of tabular data records, the subset of the identified informative features including information associated with one or more source rows of the first cluster for;

train a tabular foundation model to perform a predictive data management task in a data fabric application, based on the received plurality of tabular data records, wherein the tabular foundation model corresponds to a deep learning model, and wherein the training comprises predicting, by the tabular foundation model, content of the masked subset of the identified informative features;

optimize the trained tabular foundation model using self-supervision techniques, wherein the self-supervision techniques operate based on at least three loss functions comprising a representative row generation function, a masked cell modeling function, and an entity matching function, wherein the representative row generation function measures a categorical cross entropy loss based on a ground truth cell value and a softmax output indicating a probability of a cell value, wherein the masked cell modeling function measures a cross entropy loss based on the ground truth cell value and the probability of the cell value, and wherein the entity matching function measures a contrastive learning score based on pair-wise entity matching scores from a probabilistic matching engine; and execute the optimized tabular foundation model to perform the predictive data management task.

8. The computer program product of claim 7, wherein the instructions are further executable to export at least a portion of the trained tabular foundation model to a database or a user device.

9. The computer program product of claim 7, wherein the instructions are further executable to bucket the received plurality of tabular data records into at least one bucket by analyzing the plurality of tabular data records and assigning each of the plurality of tabular data records to a bucket of the at least one bucket based on at least one of the identified informative features.

10. The computer program product of claim 7, wherein the instructions are further executable to generate a plurality of transitive links between data records having a transitive relationship.

11. The computer program product of claim 7, wherein the tabular foundation model is trained to predict a representative row that captures information from at least one source row.

12. The computer program product of claim 7, wherein the identifying the informative features within the first cluster further comprises using an explainable entity matching technique to identify a column in the first cluster containing the informative features.

13. A system comprising:

a processor set, one or more computer readable storage media, and program instructions collectively stored on the one or more computer readable storage media, the program instructions executable to:

receive a plurality of tabular data records;

generate a plurality of clusters within the received plurality of tabular data records, wherein each cluster is associated with a specific real-world entity;

identify informative features within a first cluster of the plurality of clusters of the received plurality of tabular data records by identifying a random subset of tabular data records for each cluster;

mask a subset of the identified informative features within the first cluster of the plurality of clusters of the received plurality of tabular data records, the subset of the identified informative features including information associated with one or more source rows of the first cluster for;

train a tabular foundation model to perform a predictive data management task in a data fabric application, based on the received plurality of tabular data records, wherein the tabular foundation model corresponds to a deep learning model, and wherein the training comprises predicting, by the tabular foundation model, content of the masked subset of the identified informative features;

optimize the trained tabular foundation model using self-supervision techniques, wherein the self-supervision techniques operate based on at least three loss functions comprising a representative row generation function, a masked cell modeling function, and an entity matching function, wherein the representative row generation function measures a categorical cross entropy loss based on a ground truth cell value and a softmax output indicating a probability of a cell value, wherein the masked cell modeling function measures a cross entropy loss based on the ground truth cell value and the probability of the cell value, and wherein the entity matching function measures a contrastive learning score based on pair-wise entity matching scores from a probabilistic matching engine; and execute the optimized tabular foundation model to perform the predictive data management task.

14. The system of claim 13, wherein the instructions are further executable to:

bucket the received plurality of tabular data records into at least one bucket by analyzing the plurality of tabular data records and assigning each of the plurality of tabular data records to a bucket of the at least one bucket based on at least one of the identified informative features, and generate a plurality of transitive links between data records having a transitive relationship.

15. The system of claim 13, wherein the identifying the informative features within the first cluster further comprises using an explainable entity matching technique to identify a column in the first cluster containing the informative features.

* * * * *